US008079300B2

(12) United States Patent
Jing

(10) Patent No.: US 8,079,300 B2
(45) Date of Patent: Dec. 20, 2011

(54) AUTOMATIC EJECTING DEVICE FOR CAPSULES IN COFFEE MACHINE

(75) Inventor: Yudong Jing, Zhejiang (CN)

(73) Assignee: Ningbo AAA Group Electric Appliance Co., Ltd., Zhouxiang Town, Cixi Zhejiang (CN)

( * ) Notice: Subject to any disclaimer, the term of this patent is extended or adjusted under 35 U.S.C. 154(b) by 470 days.

(21) Appl. No.: 12/376,367

(22) PCT Filed: Jun. 10, 2008

(86) PCT No.: PCT/CN2008/001123
§ 371 (c)(1),
(2), (4) Date: Feb. 4, 2009

(87) PCT Pub. No.: WO2008/154805
PCT Pub. Date: Dec. 24, 2008

(65) Prior Publication Data
US 2010/0224077 A1 Sep. 9, 2010

(30) Foreign Application Priority Data
Jun. 15, 2007 (CN) .......................... 2007 1 0069344

(51) Int. Cl.
*A47J 31/00* (2006.01)
*A47J 31/06* (2006.01)
*A47J 31/40* (2006.01)
*A47J 31/44* (2006.01)

(52) U.S. Cl. ....... 99/289 R; 99/295; 99/302 P; 99/302 R

(58) Field of Classification Search ................. 99/289 R, 99/295, 302 P, 302 R, 297, 323; 426/77; 206/0.5
See application file for complete search history.

(56) References Cited

U.S. PATENT DOCUMENTS

| 5,776,527 | A  | * | 7/1998  | Blanc ............................. 426/77 |
| 6,026,732 | A  | * | 2/2000  | Kollep et al. .................. 99/295 |
| 6,431,055 | B2 | * | 8/2002  | Bonanno ..................... 99/302 P |
| 7,444,927 | B1 | * | 11/2008 | Crosville et al. ............... 99/295 |
| 7,513,192 | B2 | * | 4/2009  | Sullivan et al. ............ 99/289 R |
| 7,703,380 | B2 | * | 4/2010  | Ryser et al. .................... 99/295 |
| 7,921,766 | B2 | * | 4/2011  | Halliday et al. ............... 99/295 |
| 2009/0249961 | A1 | * | 10/2009 | Cheng ........................ 99/289 R |
| 2011/0000377 | A1 | * | 1/2011  | Favre ......................... 99/289 R |

* cited by examiner

*Primary Examiner* — Sebastiano Passaniti
(74) *Attorney, Agent, or Firm* — Global IP Services; Tian Hua Gu

(57) ABSTRACT

The invention relates to an automatic ejecting device for capsules in a coffee machine comprising a housing, a first frame, a second frame and a driving system; two jaws movably jointing with two sides of said second frame respectively, and the front portion of each jaw being able to splay and close relating to said second frame; while a first shaft being mounted on the front of each jaw vertically, and a second shaft being mounted on the rear of each jaw vertically, two pairs of guiding grooves being mounted on the housing. Under the driving system which makes the second word to move and the effect of the collaboration of the first shaft and the guiding grooves, the limiting parts on the front of the jaws can splay on proper time, then the capsule will drop down from the limiting parts.

10 Claims, 16 Drawing Sheets

AUTOMATIC EJECTING DEVICE FOR CAPSULES IN COFFEE MACHINE

FIELD OF THE INVENTION

The present invention relates to the field of the coffee machine, in particular, to a kind of automatic ejecting device for capsules in a coffee machine.

BACKGROUND OF THE INVENTION

With the ceaseless progress of the society, various coffee machines appear one after the other. The traditional components in the coffee machine usually include a water pot, a heating unit, and a water pump and so on. In order to make the carrying easy, some coffee, such as the baked and ground coffee and instant coffee and so on, are packed into a hermetic capsule which is similar to the fruit jelly capsule. When using, we can put the capsule which has coffee in it into the coffee machine, then pump the heated water to the chamber in which the capsule placed in the coffee machine, the heated water passes through the raw material to be extracted like coffee, finally, the hot coffee can outflow from the outlet pipe of the coffee machine to the cup. After using, we have to take out the disused capsule. So to the prior coffee machine, we have to take the capsule out from the chamber by hand and throw away after every operation. So it is inconvenient.

To the above said existing situation, a coffee machine, which allows the used capsule drop to the garbage bin set in the coffee machine automatically, is invented. There is no need to take the used capsule out of the chamber by hand every time, instead, to take the garbage bin out of the coffee machine and dump used capsules in the garbage bin after multiple operating. It is more convenient and humanized to use.

The subject of Chinese patent ZL94193279.6 whose Publication No. is CN1130345Y and PCT Publication No. is WO95/07041 titled 'Packaging of Ground Coffee of the Pre-dosed Pastille Type and Espresso Coffee Machine Using Such Packaging', is about a special package for coffee and a device in coffee machine which can allow the used coffee tablet drop to the garbage bin set in the coffee machine automatically. According to the invention, the coffee machine extends in a longitudinal direction and essentially comprises a water heater, a cylinder and piston assembly and two abutments disposed at one end of the water heater in a position perpendicular to said longitudinal direction. The cylinder and piston assembly co-acting with said water heater at said abutments so as to fix in place a coffee tablet. A slot is situated on the upper portion of the coffee machine allowing the coffee tablet dropping in vertically. Each abutment can rotate on the axis parallel to said longitudinal direction, so the two abutments can be parallel or at an angle to each other. When the two abutments are an angle, the coffee tablet is fixed, and when the two abutments are parallel, the coffee tablet falls outside the coffee machine by gravity.

The device to make the abutments rotate can be a cam or a rod. In that invention, though the package of coffee can be dropped automatically, but it requires the special package of coffee, and it also needs a device designed to drive the abutments to rotate which makes the structure of coffee machine complex, while the detail of driving device can not be found in the description of the invention.

The subject of another Chinese patent ZL00814922.4 whose Publication No. is CN1157144C and PCT Publication No. is WO01/30218A1) titled 'Cartridge Ejection Device', is about a device for ejecting a cartridge of a coffee machine. The device comprising a jaw with a fixed part and a moving part, the jaw parts forming, in the closed position, a housing for the cartridge on the front of the jaw, the moving part being mounted so that it can rotate on the rear of the fixed part, the device comprising, on the fixed part, in the region of the cartridge housing, an ejector and a pulling arm mounted on the moving part above the shaft of rotation of the moving part with, at the end of the arm, a first pin designed to collaborate with catch members of the ejector. When the moving part opens at certain degree, the ejector will rise up, and the cartridge (that is the capsule) will slide along the declining passage and enter into the garbage bin in the coffee machine finally. The device according to this invention makes the using more convenient.

SUMMARY OF THE INVENTION

It is an object of the present invention to provide another kind of device which can also automatically eject capsules in a coffee machine. And the advantage of the ejecting device is that the structure is simple and suitable and can be operated steadily and easily with good hand feeling.

For achieving this object, the automatic ejecting device for capsules in a coffee machine comprises a housing, a first frame and a second frame both mounted in said housing, said second frame designed to be movable forward and backward relating to said first frame, said first frame and the second frame forming a hermetic chamber after hermetically closing so as to contain the capsule, a driving system also being mounted in the housing to close and open said first frame and second frame;

two jaws movably jointing with two sides of said second frame respectively, the front portion of each jaw bending and extending to the front surface of said second frame to form a limiting part, these two limiting parts being set apart so as to limit the movement of the capsule, and the front portion of each jaw being able to splay and close relating to said second frame;

a first shaft being mounted on the front of each jaw vertically, and a second shaft being mounted on the rear of each jaw vertically, two pairs of guiding grooves being mounted on the housing, the ends of said first and second shafts on the jaws being slide-able in the guiding groves respectively, each pair of guiding grooves comprising upper guiding groove and lower guiding groove for guiding the first shaft, therefore, the front portion of each jaw to complete at least one splaying and one closing during said second frame is moving backward.

Said each pair of upper guiding groove and lower guiding groove comprises a first sub-groove, a second sub-groove and a third sub-groove; the second sub-groove is at the front of the first sub-groove and protrudes outward, the third sub-groove is at the front of the second sub-groove and communicates with the front of second sub-groove, the front of the second sub-groove communicates with the front of the first sub-groove so that the first shaft can slide from the first sub-groove to the second sub-groove, the rear of the second sub-groove communicates with the middle of the first sub-groove so that the first shaft can slide from the second sub-groove to the first sub-groove; in at least one of upper guiding groove and lower guiding groove, a step which is higher than the second sub-groove is formed at the boundary between the front of the second sub-groove and the first sub-groove, so as to prevent the first shaft entering into the front of the first sub-groove from the front of the second sub-groove, and another step which is higher than the first sub-groove is formed at the boundary between the rear of the second sub-groove and the middle of the first sub-groove, so as to prevent the first shaft entering into the rear of the second sub-groove from the middle of the first sub-groove; the first shaft comprises an upper cylinder projected from the upper surface of the jaw and a lower cylinder projected from the bottom surface of the jaw, at least one of said two cylinders is movably located in the hole forming on the front portion of the jaw and supported by a spring.

Such designed guiding grooves can make the front of the jaw splay relatively to the second frame when the first shaft moves to the second sub-groove, during said second frame is moving backward, at this time, the capsule can fall down from the bended front limiting part of two jaws under the effect of gravity. When the second frame continues to move backward, the front of the jaws will close gradually, at the time that the first shaft slides from the second sub-groove into the first sub-groove, the laying space for the capsule will reform between the bended front limiting parts of two jaws, being ready for the next capsule. Such designed guiding grooves have the advantage of simple and reasonably structure, steady in single-direction and alter-direction. Of course, the other structure of guiding grooves can also be adopted to drive the front of the jaw to finish one splaying and closing relatively to the second frame.

As a preference, only the lower guiding groove has said steps. The advantage of this preferred embodiment is that the effectual splaying and closing of the jaws can be ensured, the manufacture is easy, and the manufacturing cost is low.

Also as a preference, both the lower guiding groove and the upper guiding groove have said steps. The advantage of this preferred embodiment is that the jaws act more smoothly, and the only disadvantage of this preferred embodiment is that the manufacturing cost is increased.

Said third sub-groove is gradually bending outward from rear to front. So that, when the second frame and the first frame completely close, the bended front limiting part on the front of the jaw is also at the situation of splaying, to ensure the hermetic ability between closed the first frame and the second frame. Of course, some improvement on the rear surface of the first frame, such as a containing gap arranged on the rear surface of the first frame, can also ensure the hermetic ability between closed the first frame and the second frame, but it might increase the difficulty of manufacture and precision of the first frame, as well as increase the manufacturing cost.

Said second sub-groove is convex outward in arc-shape. The convex second sub-groove can make the first shaft slide along the second sub-groove easily with good hand feeling Of course, the second sub-groove can also be in the shape of isosceles trapezoid or triangle or other shape that can make the first shaft move outward at first and then move inward.

In order to make the assembling of the first shaft easy, only the lower cylinder of the shaft is movably located in the hole forming on the front portion of the jaw and supported by a spring, and the upper cylinder of the first shaft and the jaw are formed integratively. So only the spring and the lower cylinder of the first shaft should be assembled in order. Said jaw joint with the second frame by the following structure: two projecting shafts are respectively mounted on the two sides of the second frame, a lengthwise slot hole for receiving said shaft is set on the middle of each jaw. The structure has the advantage of assembling easily. Of course, the jaw can be mounted on the sides of the second frame by other structure, for example, a global groove is arranged on the inner surface of the jaw, and the end of the projecting shaft is designed to be a global head to match the global groove, when assembling, the end of the projecting shaft is put into the global groove of the jaw, so that, the jaw can splay and close relatively to the second frame. The projecting shaft can also be designed to be an upward bending, and the jaw is set outside of the projecting shaft from up to down, so that, the jaw can also splay and close relatively to the second frame. Anyway, the structure can be various.

The lower portion of the end of the bended front limiting part of the jaw is in the shape of a concave arc to support the capsule steadily when the jaws closed.

A cavity for containing the capsule is set in the rear portion of the first frame, and wherein a compressed spring is fixed to push the capsule outside smoothly Compared with the prior art, in this present invention, when the second frame moves driven by the transmission system, the jaws splay on proper time under the co-operating between the first shaft and the corresponding guiding grooves, to make the distance between the two bended front limiting parts of the jaws bigger than the diameter of the capsule, so that the capsule falls down from the two bended front limiting parts and drops into the garbage bin in the coffee machine. The whole falling procedure of the capsule is compact, and the structure is simple, the assembling is easy too.

BRIEF DESCRIPTION OF THE DRAWINGS

FIG. 1 is a perspective view of the automatic ejecting device for capsules in a coffee machine in accordance with an exemplary embodiment of the present invention the first frame and the second frame are completely open and the capsule is not placed in.

FIG. 3 is another perspective view of the automatic ejecting device for capsules in a coffee machine in accordance with an exemplary embodiment of the present invention in the condition that the upper portion of the housing is removed, the first frame and the second frame are completely open and the capsule is not placed in.

FIG. 8 is a perspective view of the embodiment in accordance with an exemplary embodiment of the present invention in the condition that the upper portion of the housing is removed, the first frame and the second frame are completely open and the capsule is placed in.

FIG. 13 is a perspective view of the automatic ejecting device for capsules in a coffee machine in accordance with an exemplary embodiment of the present invention in the condition that the upper portion of the housing is removed, the first frame and the second frame are going to close and the capsule is placed in.

FIG. 14 is a perspective view of the automatic ejecting device for capsules in a coffee machine in accordance with an exemplary embodiment of the present invention in the condition that the upper portion of the housing is removed, the first frame and the second frame are fully close and the capsule is placed in.

DETAILED DESCRIPTION OF THE INVENTION

Figure 1:
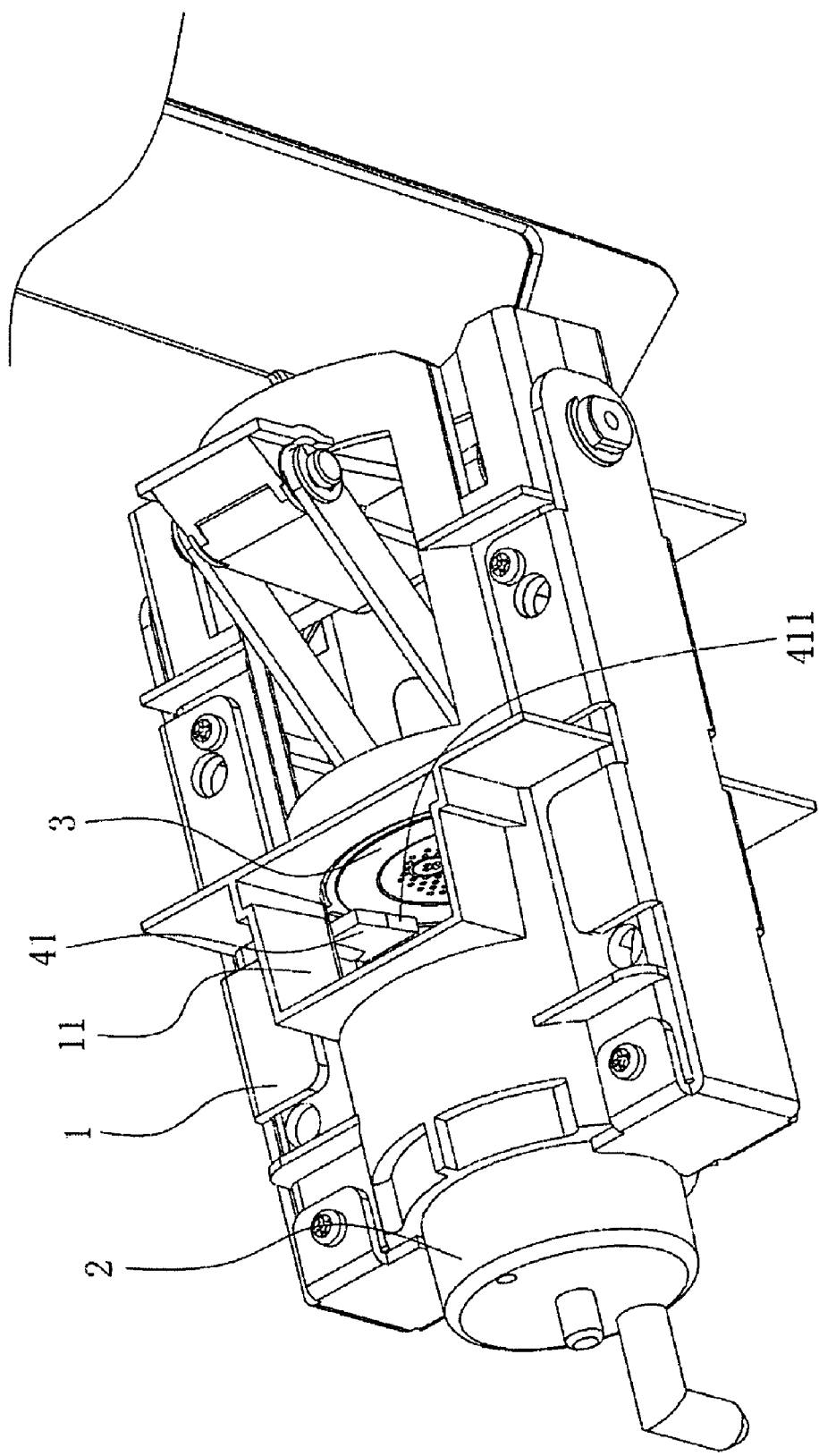
Figure 2:
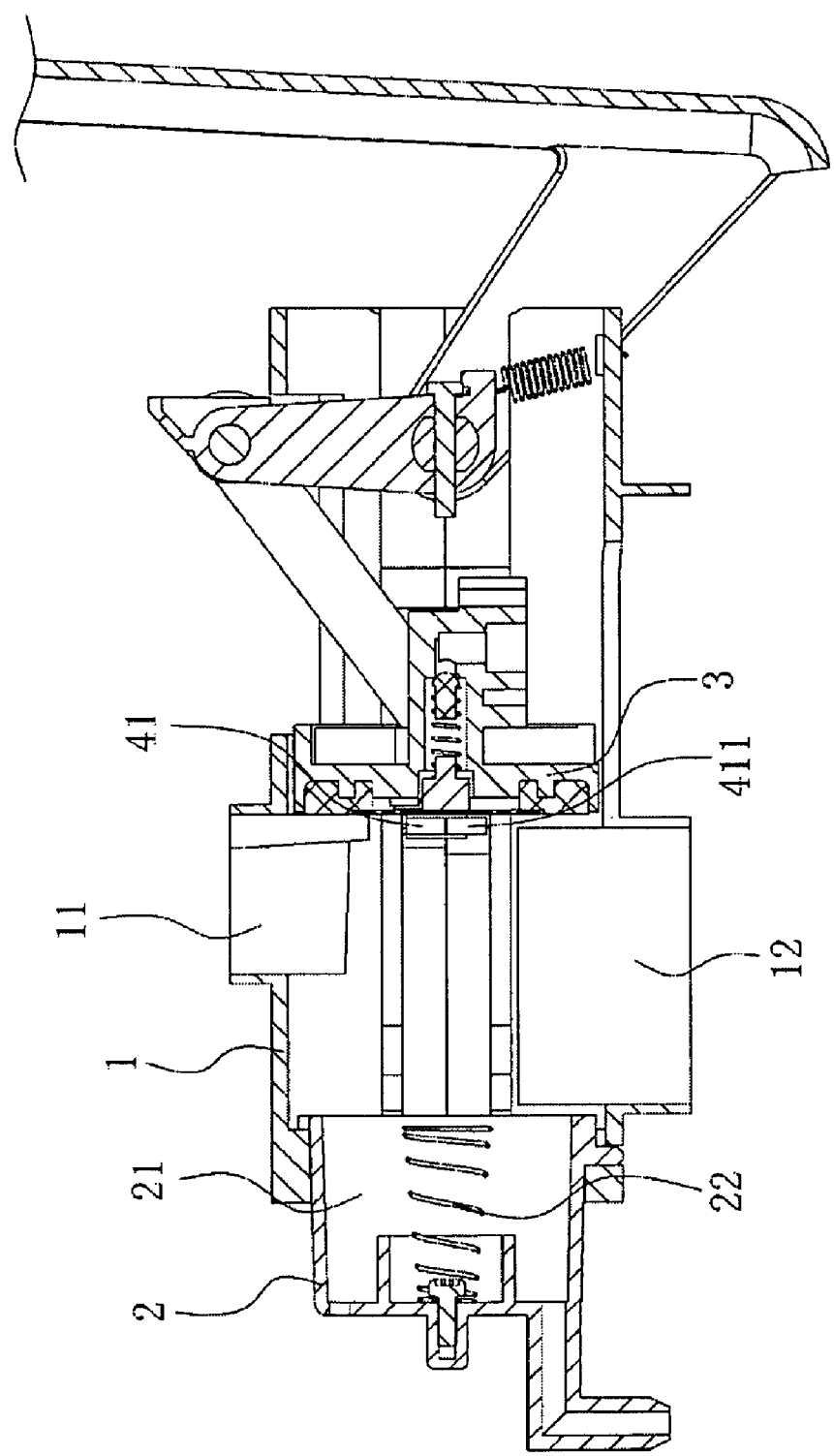
FIG. 2 is the sectional view of the automatic ejecting device for capsules in a coffee machine of FIG. 1.
Figure 3:
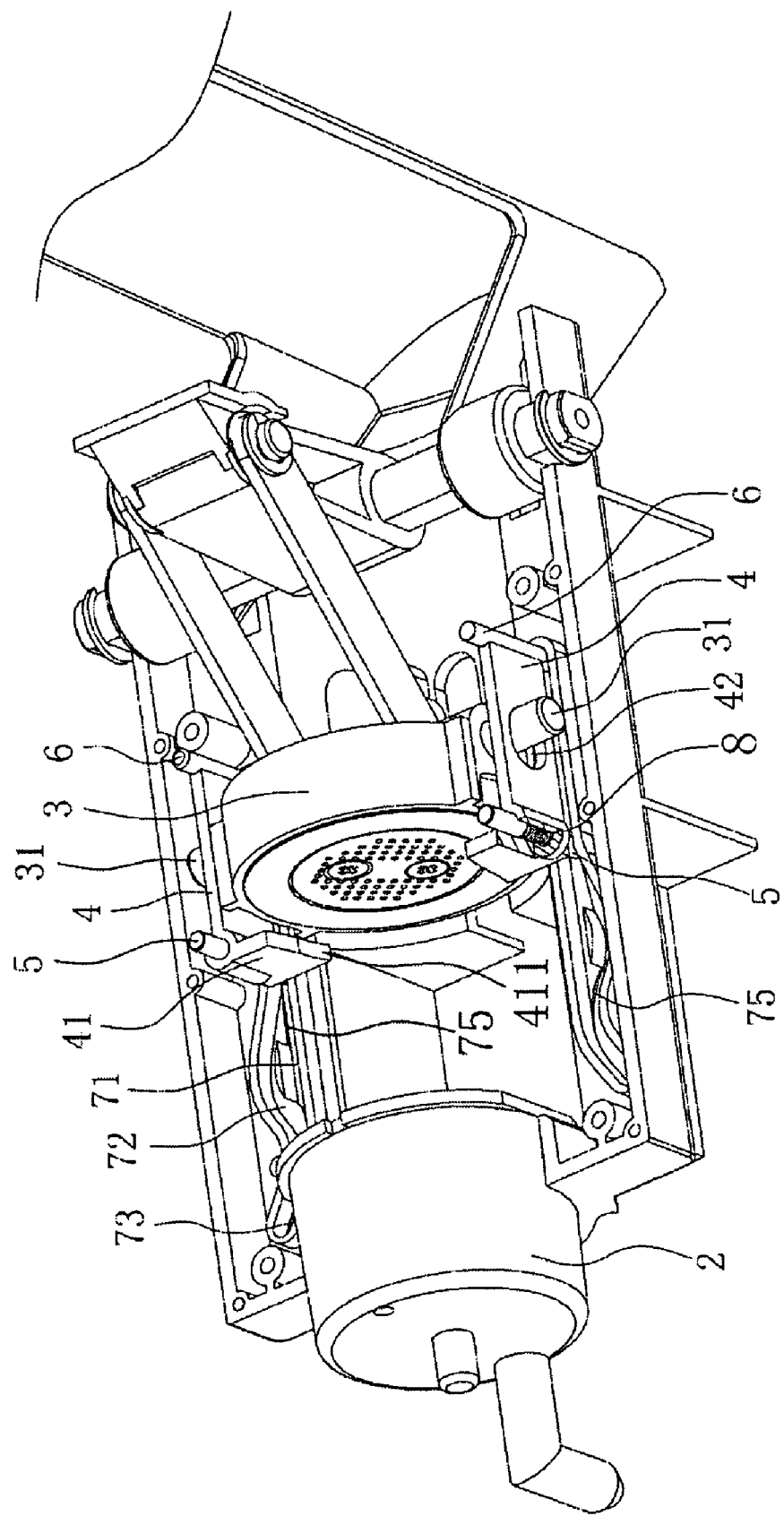

To enable a further understanding of the innovative and technological content of the invention herein, refer to the detailed description of the invention and the accompanying drawings below:

FIGS. 1~18 show an embodiment of the present invention.

In this embodiment, the automatic ejecting device for capsules in a coffee machine comprises a housing (1), a first frame (2) and a second frame (3) both mounted in said housing (1). The first frame (2) is fixed on the front of the inner of the housing (1), and the second frame (3) is at the rear of the inner of the housing (1), while said second frame (3) is designed movable forward and backward relating to said first frame (2). A cavity (21) for containing the capsule (9) is set in the rear portion of the first frame (2), so that the first frame (2) and the second frame (3) to form a hermetic chamber after hermetically closing so as to contain the capsule (9). A bulgy annulation (91) is arranged on the rear end of the capsule (9), and the capsule (9) is extracted in this hermetic chamber. A compressed spring (22) is fixed in the cavity so as to push the capsule (9) outside, then, when the second frame (3) is moving backward, the compressed spring (22) pushes the capsule (9), and makes the capsule (9) move backward with the second word (3). Furthermore, a driving system also being mounted in the housing (1) to close and open said first frame (2) and the second frame (3), the driving system is be a bar linage, which comprises a handle with two arms, transmitting pole and a jointing pole, jointing each other in order. The driving system is not the content that the present invention protects, the detail is described in the patent that the applicant has applied and would not be described here. Of course the driving system can also adopt other project.

Two jaws (4) respectively and movably jointing with two sides of said second frame (3), the jaw (4) joint with the second frame (3) by the following structure: two projecting shafts (31) are respectively mounted on the two sides of the second frame (3), a lengthwise slot hole (42) for receiving the projecting shaft (31) is set on the middle of each jaw (3), and the slot hole (42) is in bar-shape, that is the height of the slot hole (42) is equal to or litter bigger than the diameter of the projecting shaft (31), while the transverse width of the slot hole (42) is bigger than the diameter of the projecting shaft (31), and the projecting shaft (31) runs through the slot hole (42). That is to make it convenient that the two jaws (4) can splay and close relating to the second frame (3), and to make the jaws (4) limited up and down.

The front portion of each jaw (4) bending and extending to the front surface of said second frame (3) forming a limiting part. The lower portion of the end of the bended front limiting part (41) of the jaw (4) is in the shape of a concave arc to support the capsule steadily when the jaws are closed, so that the jaws (4) is approximately in L-shaped. These two bended front limiting parts (41) are set apart so as to limit the capsule (9), and the front portion of each jaw (4) is able to splay and close relating to the second frame (3).

While a first shaft (5) being mounted on the front portion of each jaw (4) vertically, and a second shaft (6) being mounted on the rear of each jaw (4) vertically, in the same time, two pairs of guiding grooves being mounted on the housing (1), the ends of said first shaft (5) and said second shaft on the jaws (4) being slide-able in the guiding grooves respectively, and each pair of guiding grooves comprises upper guiding groove (7') and lower guiding groove (7), while the upper guiding groove (7') is mounted on the upper surface of the housing (1) and lower guiding groove (7) is mounted on the lower surface of the housing (1). Moreover, each pair of guiding grooves guides for their corresponding first shaft (5), therefore, the front portion of each jaw (4) can be driven to complete at least one splaying and one closing during said second frame (3) is moving backward. The two ends of the first shaft (5) and the two ends of the second shaft (6) are all designed having global head, so that, the jaws (4) can splay and close relating to the second frame (3).

Figure 4:
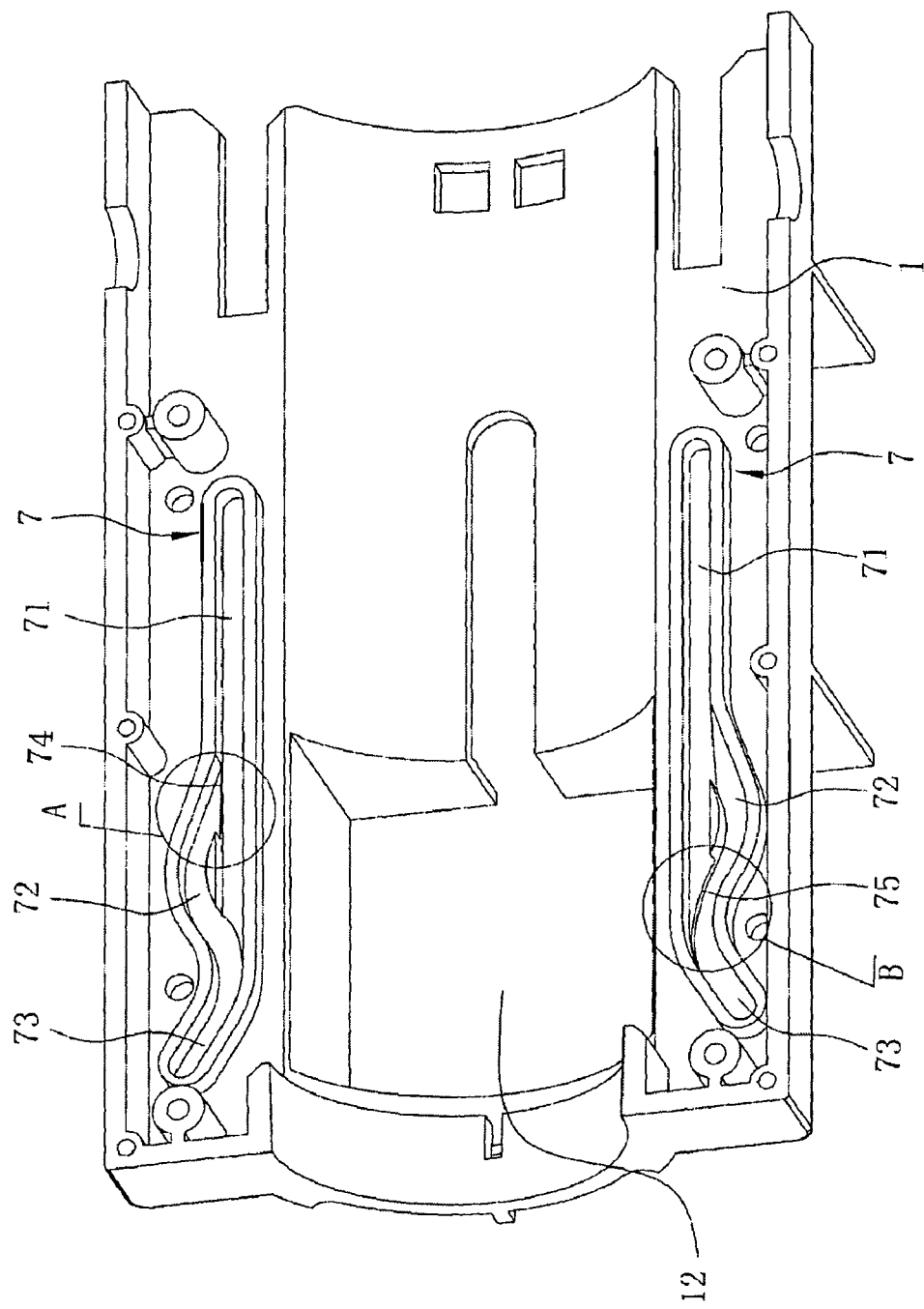
FIG. 4 is a perspective view of the lower portion of the housing in accordance with an exemplary embodiment of the present invention.
Figure 6:
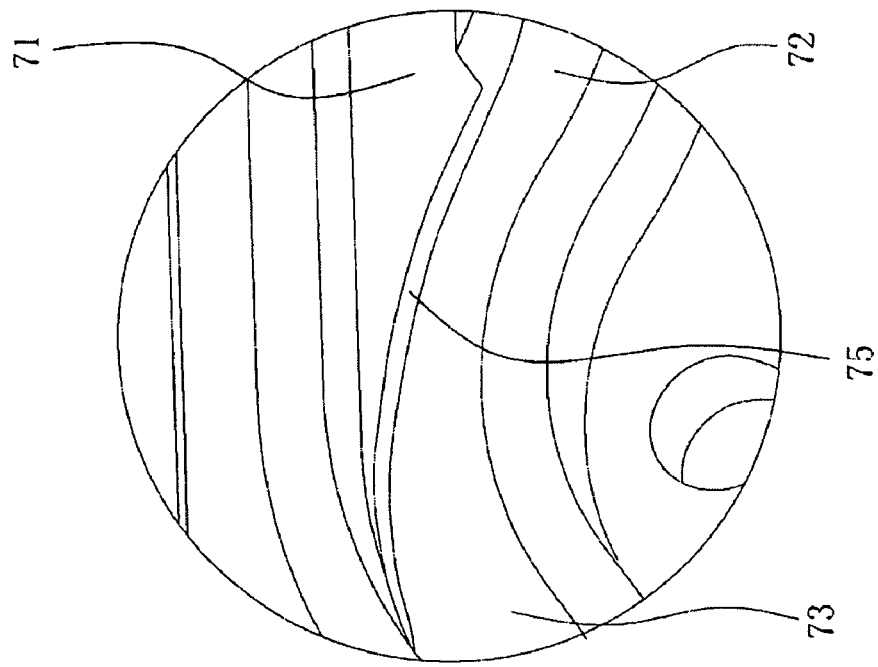
FIG. 6 is an enlarged view of region B in the FIG. 4.
Figure 5:
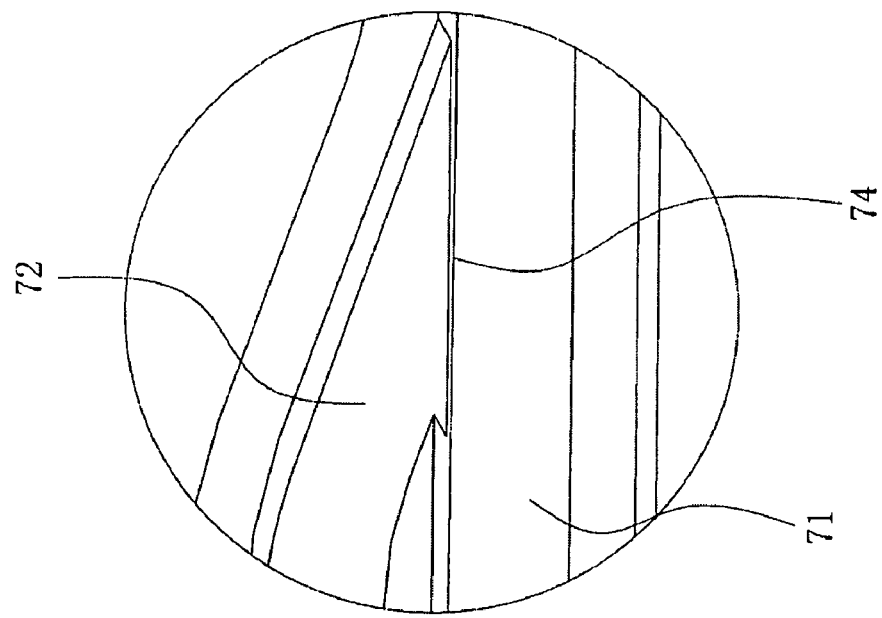
FIG. 5 is an enlarged view of region A in the FIG. 4.

As shown in FIG. 4, FIG. 5, FIG. 6, the lower guiding groove (7) consists of a first sub-groove (71), a second sub-groove (72) and a third sub-groove (73), the first sub-groove (71) is to guide for the first shaft (5) and the second shaft (6) to move flatly, the second sub-groove (72) is at the front of the first sub-groove (71) and protrudes outward, the second sub-groove (72) is convex outward in arc-shape, the second sub-groove (72) can change the direction of the first shaft (5); in the meanwhile, the third sub-groove (73) is at the front of the second sub-groove (72) and communicates with the front of second sub-groove (72), the third sub-groove (73) is gradually bending outward from rear to front; the front of the second sub-groove (72) communicates with the front of the first sub-groove (71) so that the first shaft (5) can slide from the first sub-groove (71) to the second sub-groove (72), a step (75) which is higher than the second sub-groove (72) is mounted at the boundary between the front of the second sub-groove (72) and the first sub-groove (71), so as to prevent the first shaft (5) entering into the front of the first sub-groove (71) from the front of the second sub-groove (72); the rear of the second sub-groove (72) communicates with the middle of the first sub-groove (71) so that the first shaft (5) can slide from the second sub-groove (72) to the first sub-groove (71), another step (74) which is higher than the first sub-groove is (71) mounted at the boundary between the rear of the second sub-groove (72) and the middle of the first sub-groove (71), so as to prevent the first shaft (5) entering into the rear of the second sub-groove (72) from the middle of the first sub-groove (71).

Figure 7:
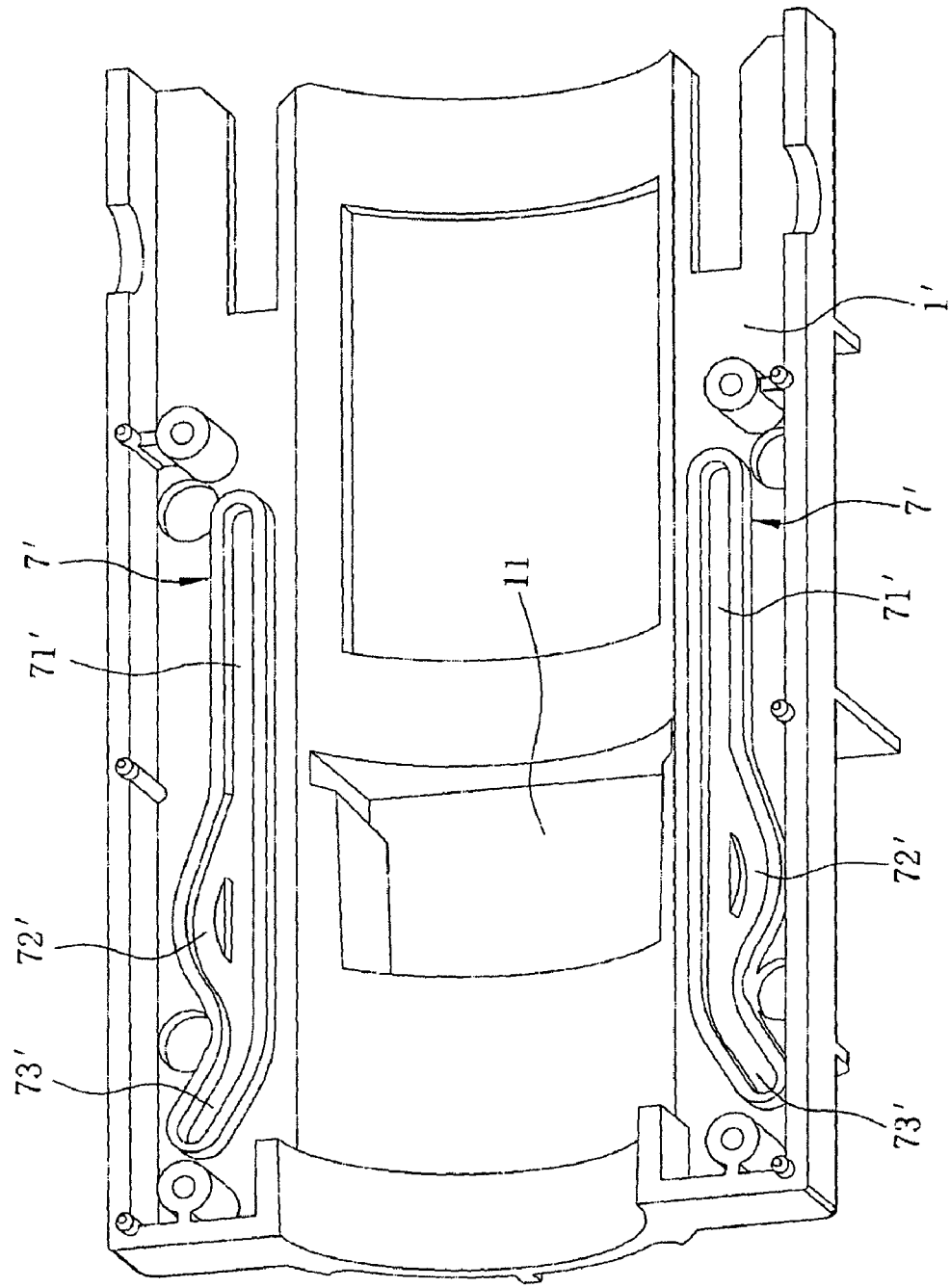
FIG. 7 is a perspective view of the upper portion of the housing in accordance with an exemplary embodiment of the present invention.
Figure 8:
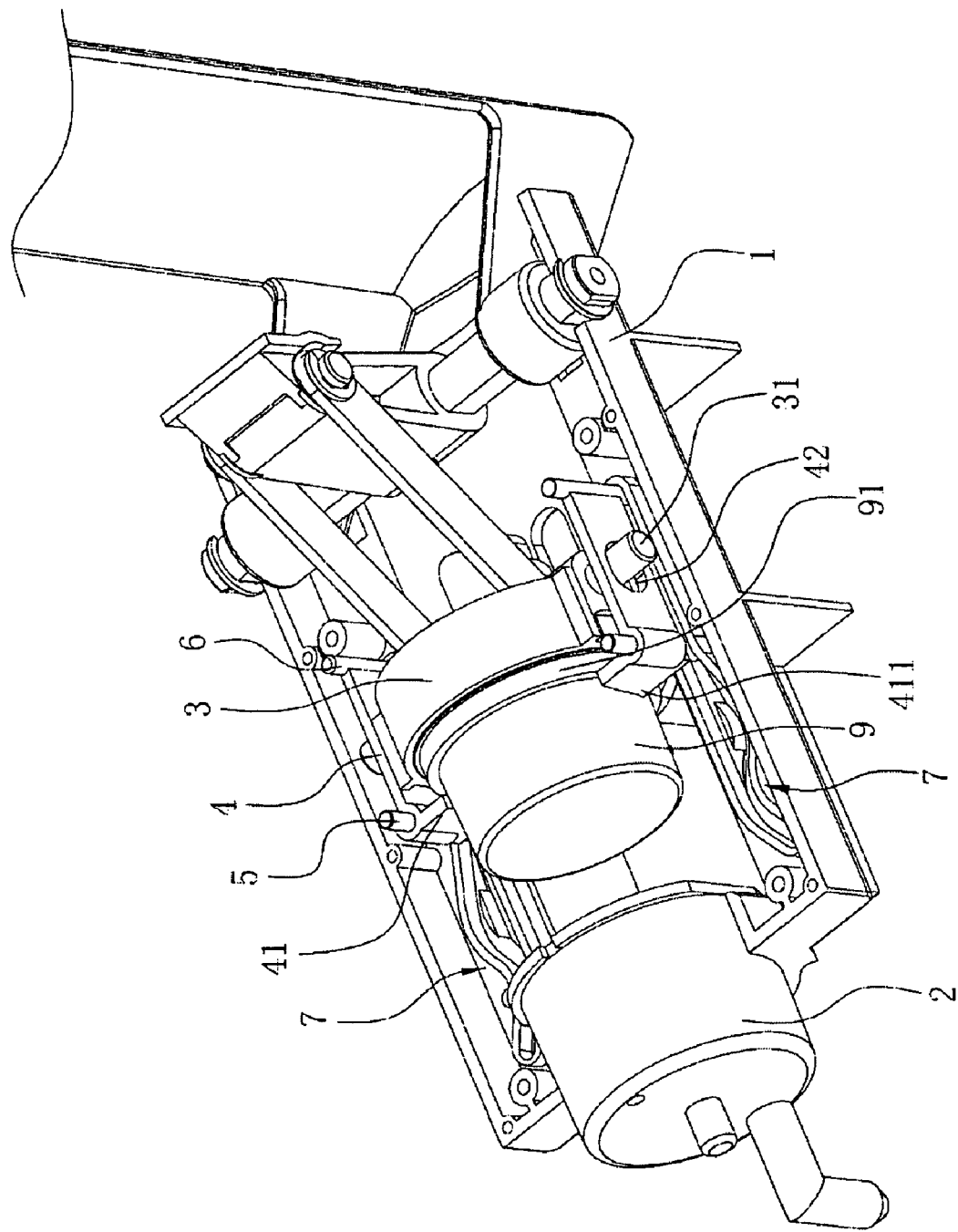
Figure 9:
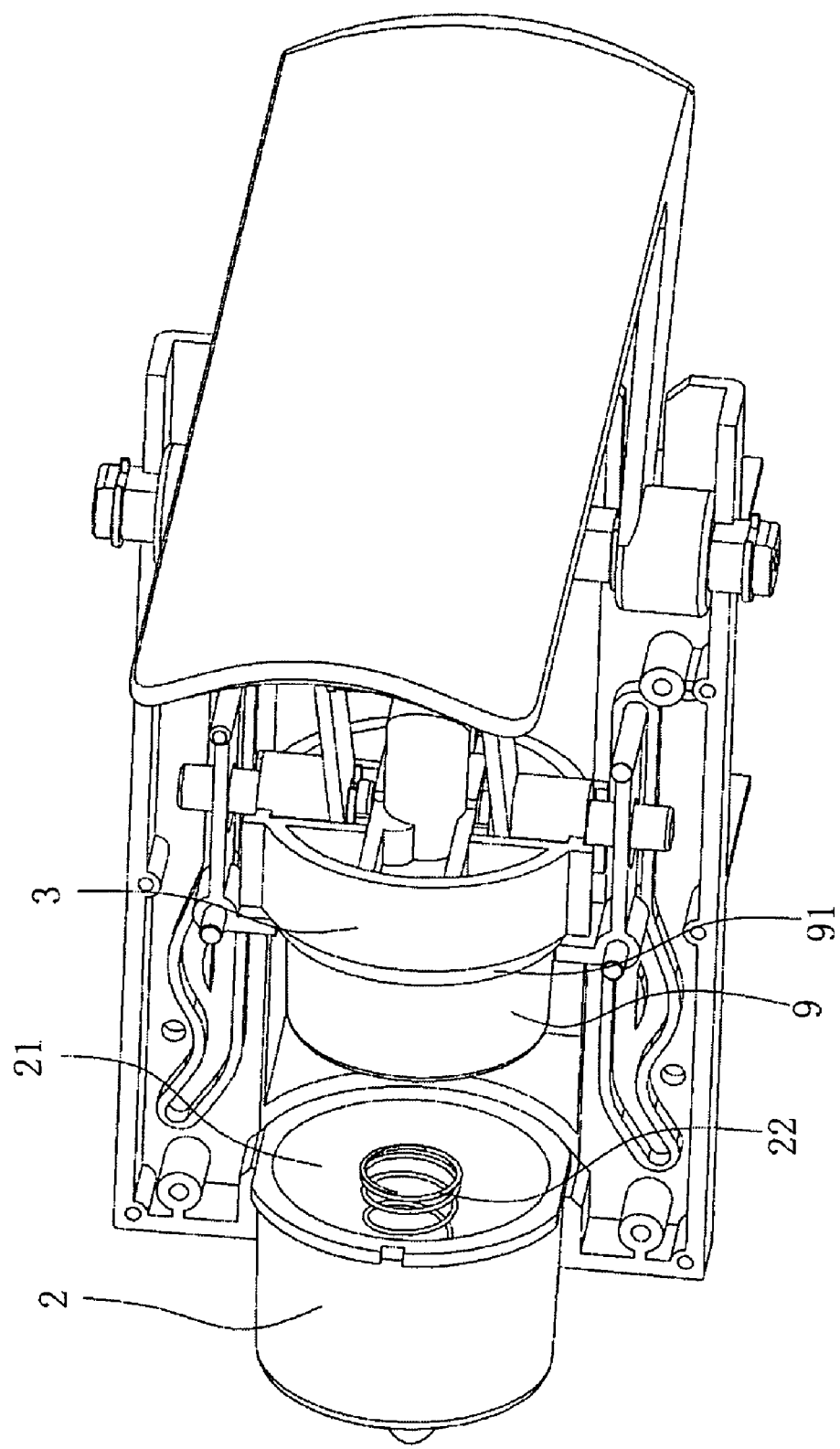
FIG. 9 is another perspective view of the automatic ejecting device for capsules in a coffee machine of FIG. 8.
Figure 10:
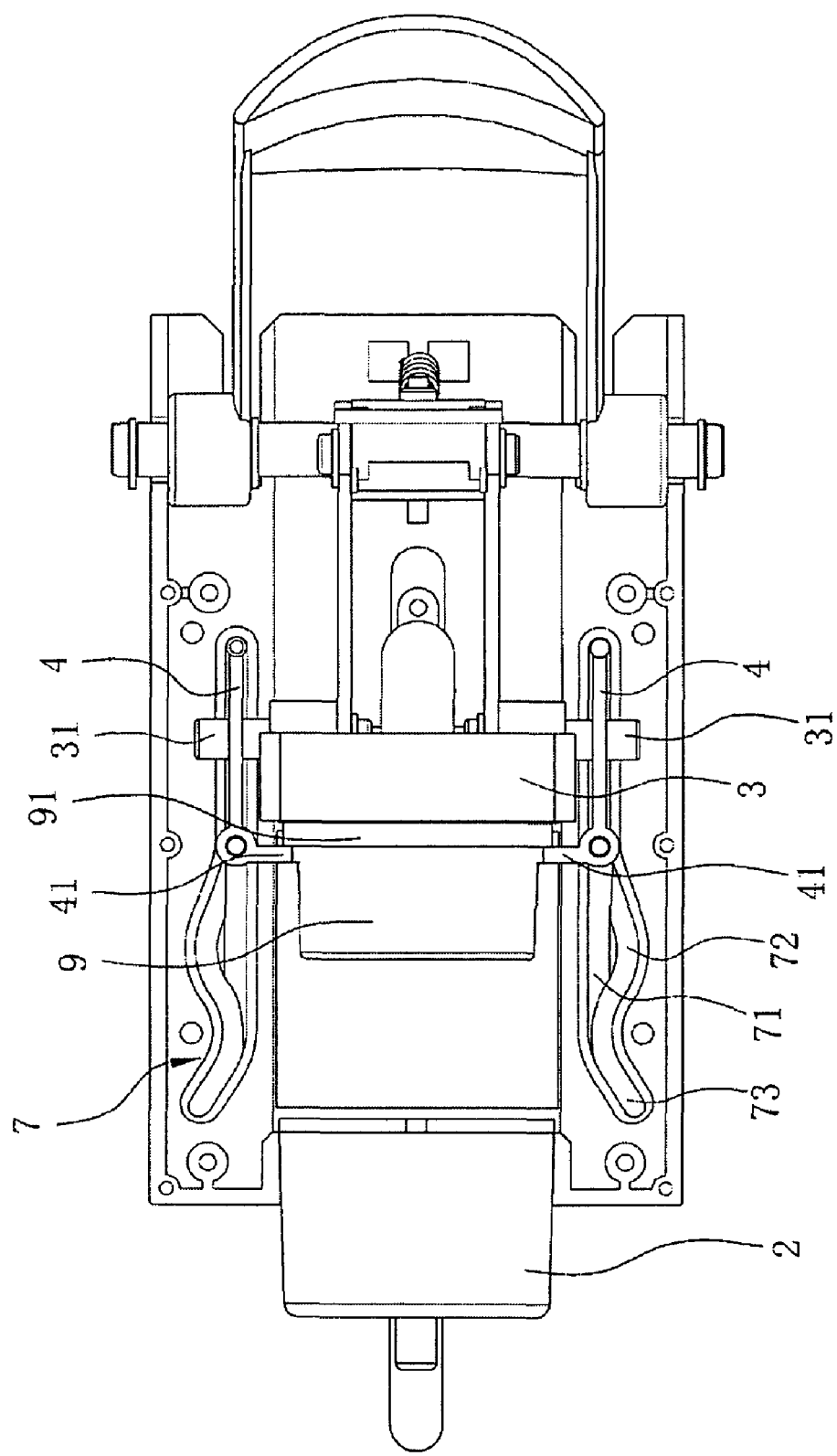
FIG. 10 is a top plan view of the automatic ejecting device for capsules in a coffee machine of FIG. 8.
Figure 11:
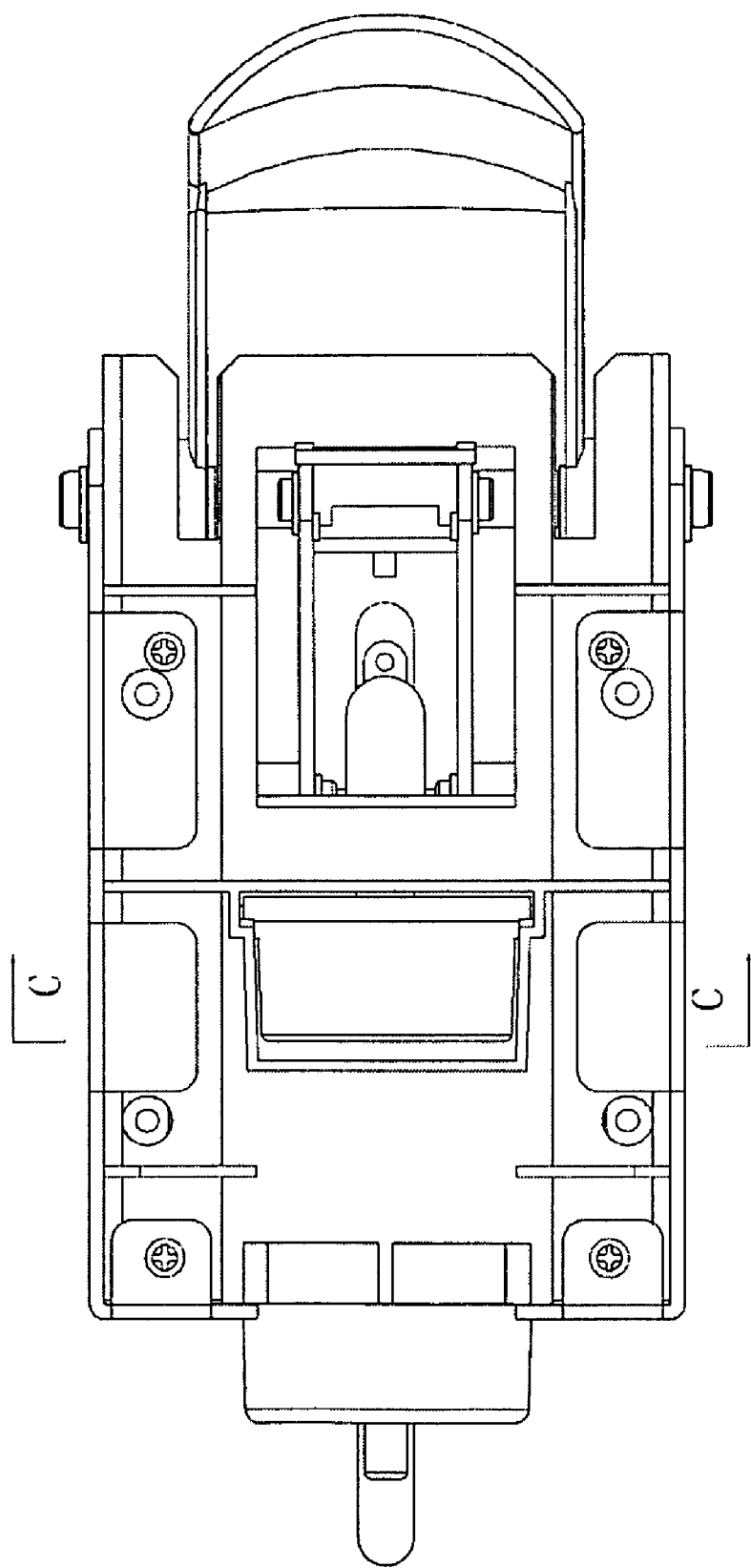
FIG. 11 is a top plan view of the automatic ejecting device for capsules in a coffee machine of FIG. 8 with the upper portion of the housing mounted.
Figure 12:
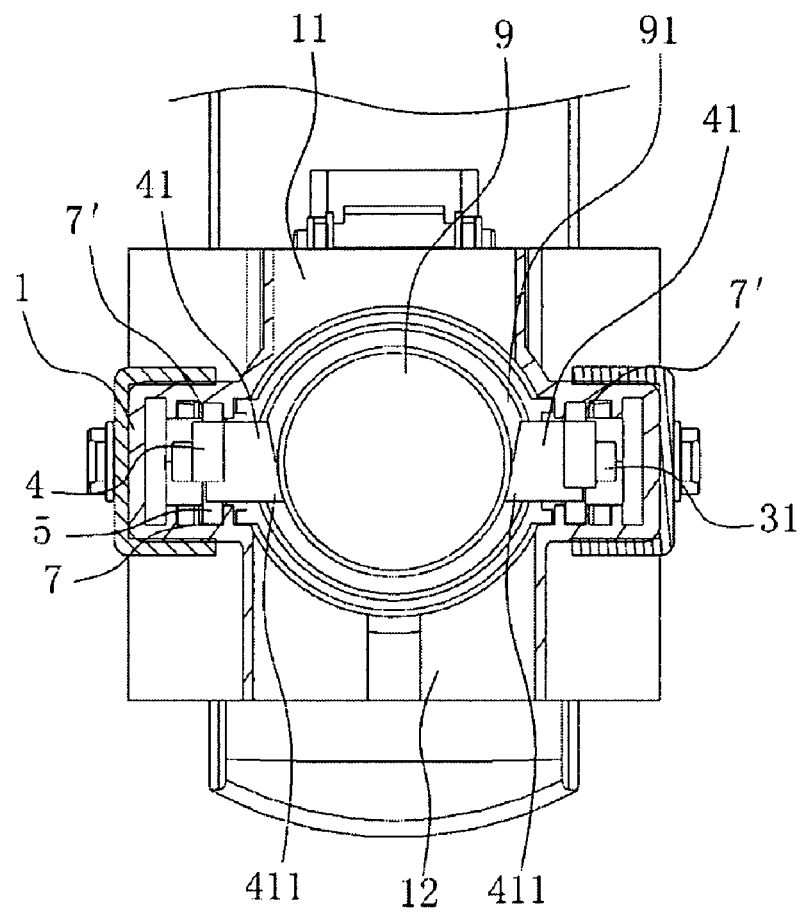
FIG. 12 is the sectional view of A-A way of FIG. 11.

As shown in FIG. 7, the upper guiding groove (7') consists of a first sub-groove (71'), a second sub-groove (72') and a third sub-groove (73'); the second sub-groove (72') is at the front of the first sub-groove (71') and protrudes outward; the third sub-groove (73') is at the front of the second sub-groove (72') and communicates with the front of second sub-groove (72'); the front of the second sub-groove (72') communicates with the front of the first sub-groove (71') so that the first shaft (5) can slide from the first sub-groove (71') to the second sub-groove (72'); the rear of the second sub-groove (72') communicates with the middle of the first sub-groove (71') so that the first shaft (5) can slide from the second sub-groove (72') to the first sub-groove (71').

Figure 18:
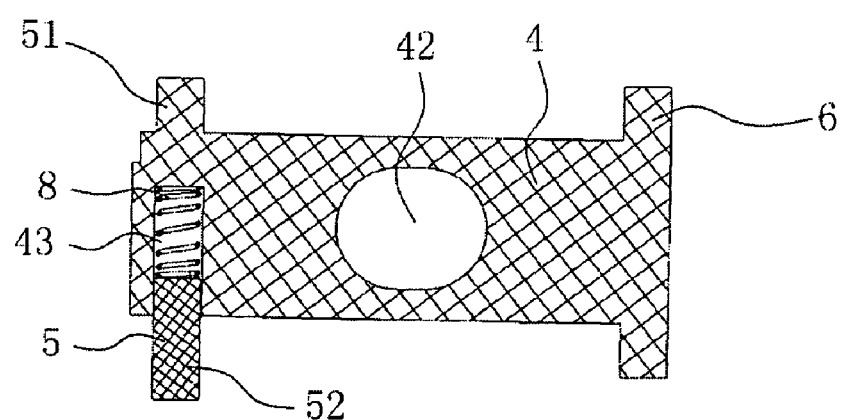
FIG. 18 is a sectional view of the jaw with the first shaft mounted.

And as shown in FIG. 18, the first shaft (5) comprises an upper cylinder (51) projected from the upper surface of the jaw (4) and a lower cylinder (52) projected from the bottom surface of the jaw (4), the upper cylinder (51) is formed integratively, the lower cylinder (52) of the first shaft (5) is movably located in the hole forming on the front portion of the jaw (4) and supported by a spring (8). The second shaft (6) and the jaws (4) are formed integratively.

A first hole (11) for placing the capsule is arranged on the top of the housing (1), and a second hole (12) for the capsule passing by is arranged on the bottom of the housing (1). The second hole (12) communicates with the garbage bin in the coffee machine, and the structure is pervasive, it is not shown in the figs.

Besides, the upper guiding groove (7') can be designed as the lower guiding groove (7), or the structures of the upper guiding groove (7') and the lower guiding groove (7) can be exchanged. So, the protection range of the present invention is not limited in the embodiment mentioned above. All of the situation which can control the falling of the capsule described as below is the protection range of the present invention: during the second frame (3) is moving, the jaws (4) can splay and close relating to the second frame (3) under the effect of the guiding groove and the first shaft (5), the second shaft (6) on the jaws collaborate with each other.

The frame principle and process of the present invention is as blows:

As shown in FIG. 1~3 and FIG. 8~12, the user wants to make a cup of coffee, as the capsule has a bulgy annulation (91) on the circumjacent of the capsule (9), the user can put the bulgy annulation (91) of the capsule (9) on the laying space formed by two bended front limiting parts (41) with distance, and the capsule (9) can be steadily fixed on the front of the second frame (3), under the obstruction of the second frame (3) and the bended front limiting parts (41) and under the supporting of the arc-shape outward surface (411) of the limiting part (41). At this time, the lower ends of the first shaft (5) and the second shaft (6) on the jaws (4) are all in the first sub-groove (71) of the lower guiding groove (7).

Figure 13:
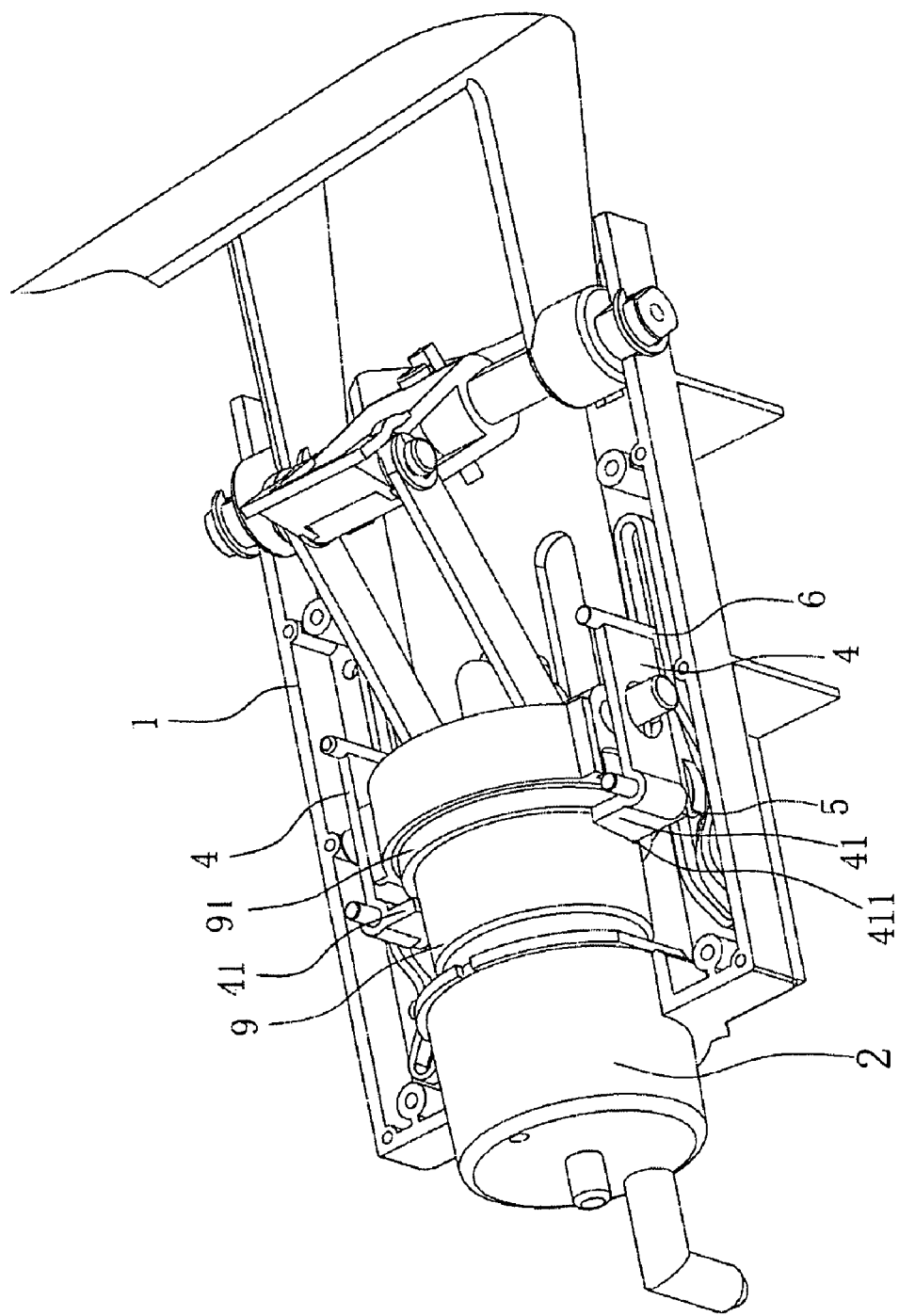
Figure 14:
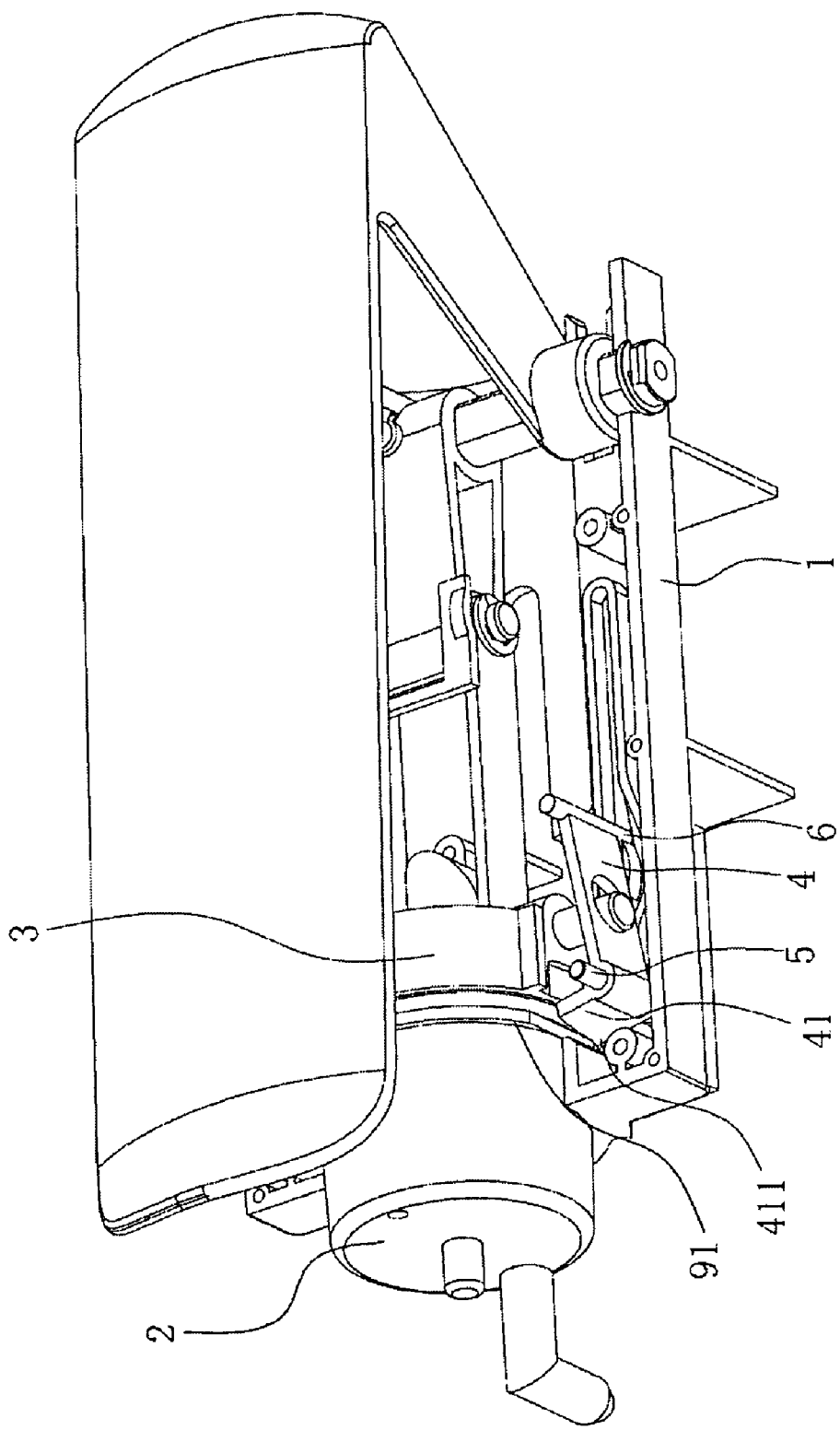
Figure 15:
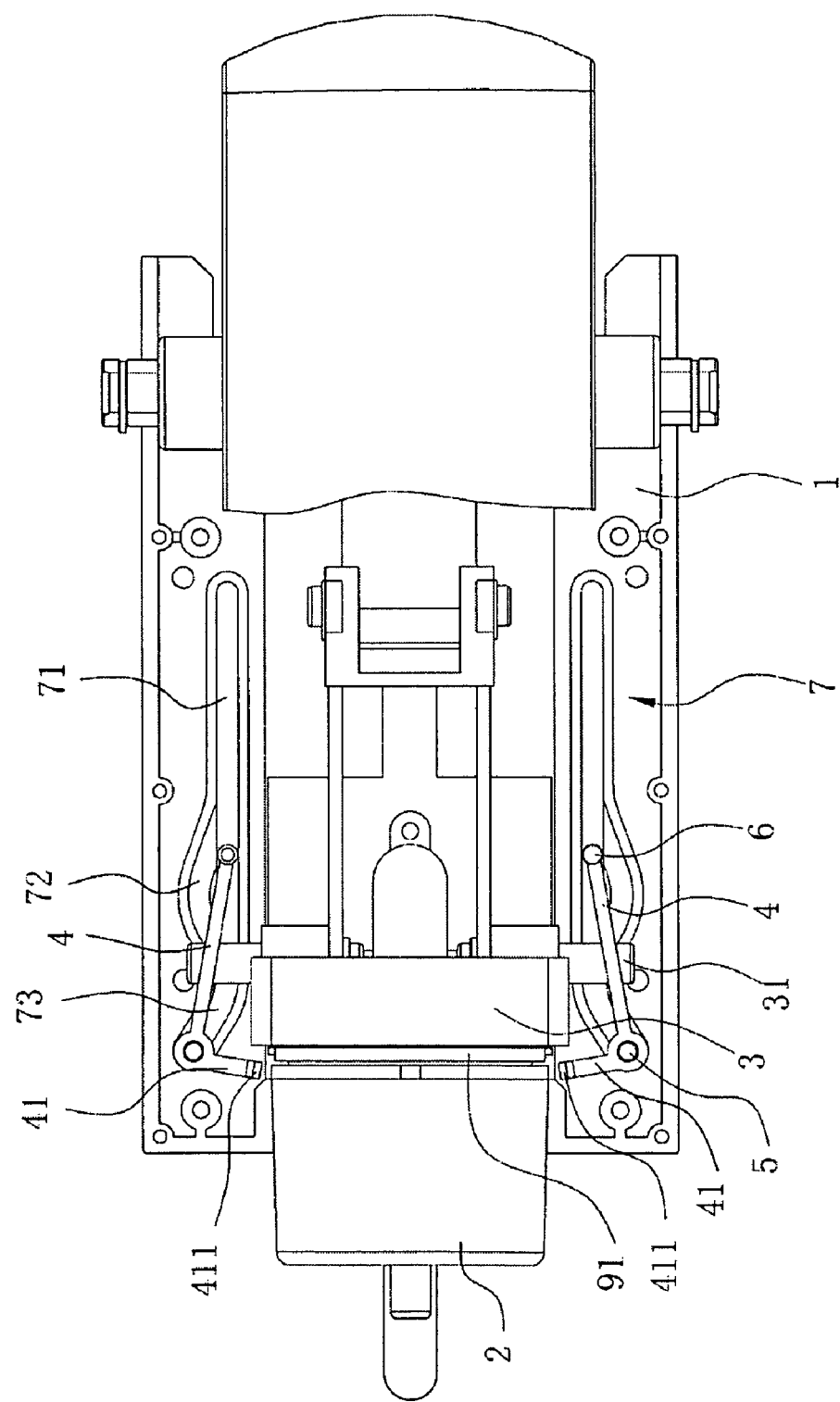
FIG. 15 is a top plan view of the automatic ejecting device for capsules in a coffee machine of FIG. 13.

As shown in FIG. 13~15, the driving system then drives the second frame (3) to move forward relating to the first frame (2), and the lower ends of the first shaft (5) and the second shaft (6) on the jaws (4) move forward too along the first sub-groove (71) of the lower guiding groove (7). When the lower end of the first shaft (5) moves to the place where the rear of the second sub-groove (72) of the lower guiding groove (7) connects the middle of the first sub-groove (71) of the lower guiding groove (7), as the effect of the step (74) at the connecting place, the lower end of the first shaft (5) continues to move forward along the first sub-groove (71) of the lower guiding groove (7) instead of entering into the rear of the second sub-groove (72), until the lower end of the first shaft (5) enters into the front of the second sub-groove (72) from the front of the first sub-groove (71), under the effect of the spring (8), the lower end of the first shaft (5) touches the bottom of the lower guiding groove (7) all along. In this process, the lower end of the first shaft (5) is sliding flatly in the first sub-groove (71), that is the jaws and the bended front limiting parts (41) are close all along, while the capsule (9) is limited in the front of the first frame (2).

At the moment that the lower end of the first shaft (5) just enters into the front of the second sub-groove (72) from the front of the first sub-groove (71), the capsule (9) just enters into the chamber of the first frame (2), then, the driving system continues to drive the second frame (3) to move forward relating to the first frame (2), while the lower end of the first shaft (5) starts to slide in the third sub-groove (73), and the lower end of the second shaft (6) stays in the first sub-groove (71) all along. As the third sub-groove (73) is gradually bending outward from rear to front, the lower end of the first shaft (5) is gradually excursing outward when it moves forward, while the level of the second shaft (6) does not move all along. So, the bended front limiting parts (41) on the jaws is gradually splaying relating to the second frame (3). When the lower end of the first shaft (5) moves to the head of the third sub-groove (73), the bended front limiting parts (41) of the jaws splay completely outward. At this time, the smallest distance of these two bended front limiting parts (41) is bigger than the biggest transverse diameter of the capsule (9), in the meanwhile, the first frame (2) and the second word (3) are completely close. As the jaws are open, the first frame (2) and the second word (3) are hermetic well in the same plane. Then the capsule is extracted, coffee will flow from the coffee machine for drink. In this process, the front ends of the first shaft (5) and the second shaft (6) are sliding along the corresponding position on the upper guiding groove (7'), so that the first shaft (5) and the second shaft (6) can move synchronously.

After the coffee is made, the driving system frames reversely to drive the second frame (3) to move backward relating to the first frame (2). At this time, the lower end of the first shaft (5) is in the third sub-groove (73), and the second shaft (6) is in the first sub-groove (61), so the jaws can gradually close, and the bended front limiting parts (41) can also gradually close. Under the effect of the compressed spring (22) in the first frame (2), the extracted capsule moves backward with the second frame (3). When the extracted capsule (9) basically disengages from the first frame (2), the compressed spring (22) will not continue to push the capsule (9). At the time that the lower end of the first shaft (5) moves to the boundary between the front of the second sub-groove (72) and the front of the first sub-groove (71), the jaws are close completely, and the bended front limiting parts (41) on the jaws continue to hold the capsule (9), so the capsule (9) will not drop down.

Figure 16:
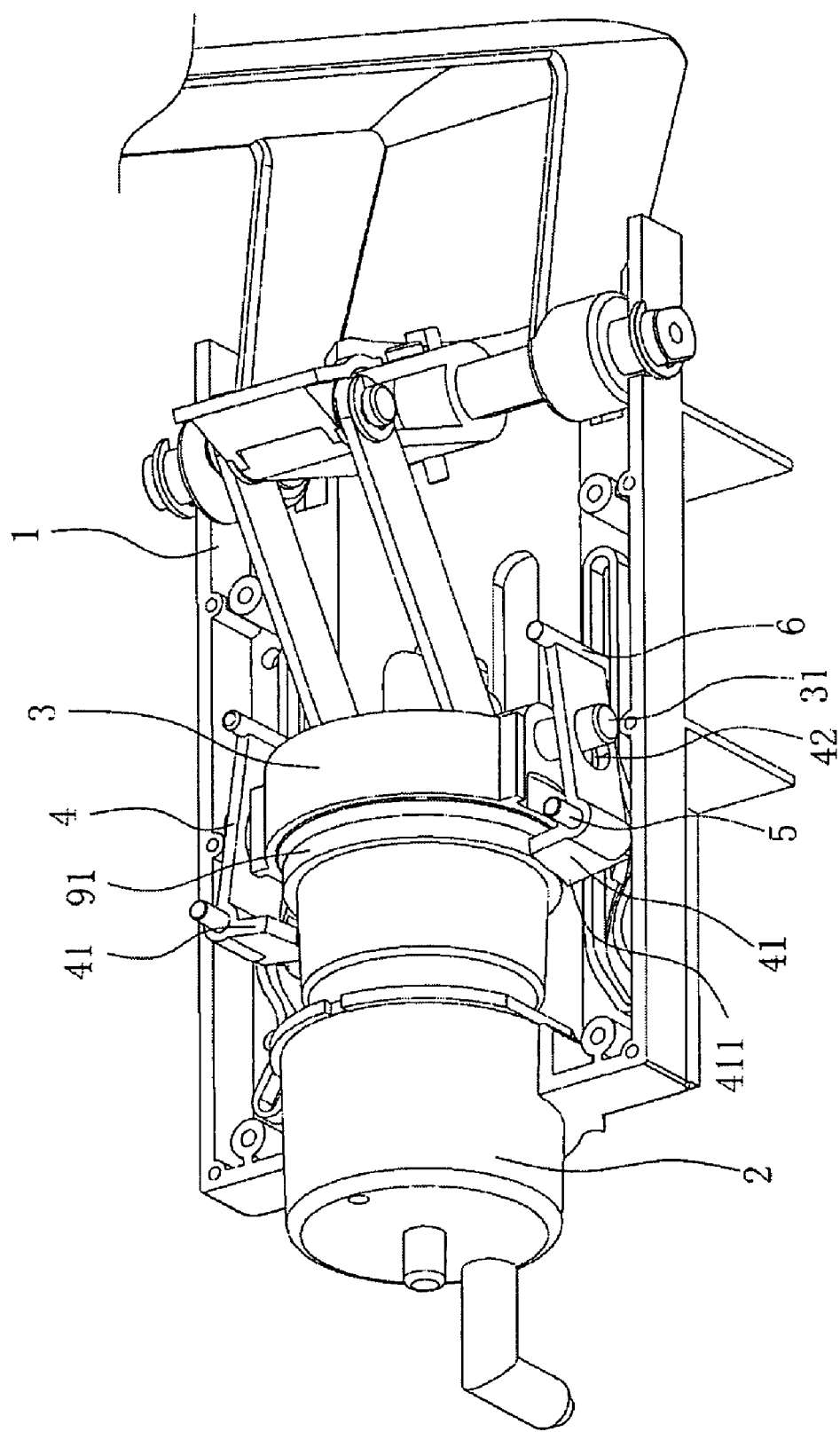
FIG. 16 is a perspective view of the automatic ejecting device for capsules in a coffee machine in accordance with an exemplary embodiment of the present invention in the condition that the upper portion of the housing is removed, the first frame and the second frame are open and the capsule is not be hold.
Figure 17:
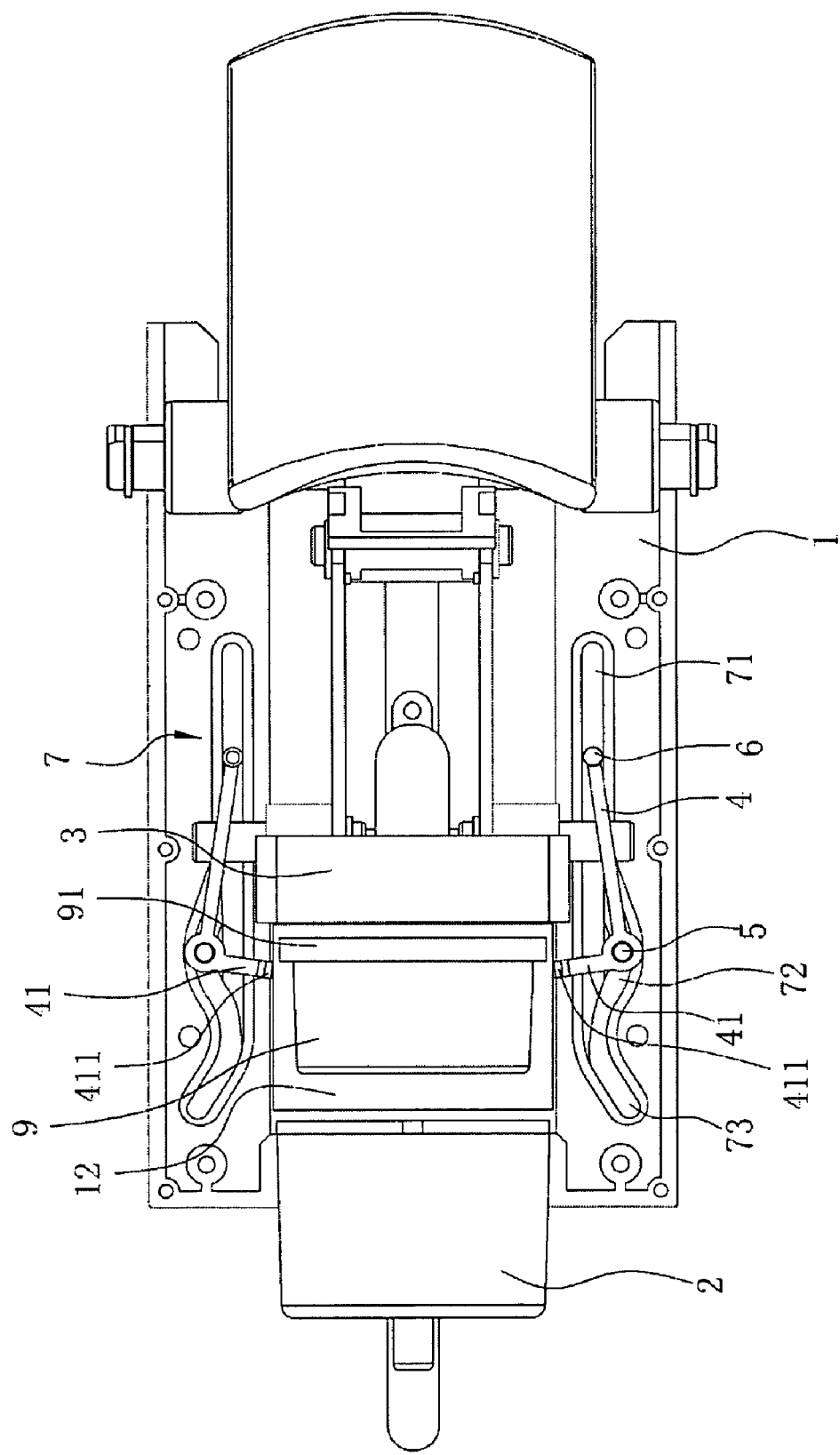
FIG. 17 is a top plan view of the automatic ejecting device for capsules in a coffee machine of FIG. 16.

The driving system continues to frame reversely, and the capsule (9) continues to move backward with the second frame (2). Under the limiting effect of the step in the connecting place, the lower end of the first shaft (5) can not enter into the front of the first sub-groove (71) from that place, and will continue to move backward along the second sub-groove (72). Because the second sub-groove (72) is convex outward and the front ends of the first shaft (5) and the second shaft (6) is sliding along the corresponding position of the upper guiding groove, the jaws will gradually splay relating to the second frame (3), and the bended front limiting parts (41) will gradually splay too. When the lower end of the first shaft (5) is in the middle of the second sub-groove (72), that is the lower end of the first shaft (5) is in the outside edge of the second sub-groove (72), the lower end of the second shaft (6) is in the first sub-groove all along, while the jaws and the bended front limiting parts (41) of the jaws (4) splay completely outward, and the smallest distance of these two bended front limiting parts (41) is bigger than the biggest transverse diameter of the capsule (9). So the capsule (9) can not continue to be hold at the front of the second frame (3), the capsule (9) drops from the hole (11) on the bottom of the housing (1) to the garbage bin in the coffee machine under the gravity, then the falling process of the capsule (9) is finished, as shown in FIG. 16 and FIG. 17.

The lower end of the first shaft (5) continue to move backward along the second sub-groove (72), the jaws (4) gradually close relating to the second frame (3), the two bended front limiting parts (41) also close gradually. Until the first shaft (5)

enters into the middle of the first sub-groove (71) form the rear of the second sub-groove (72), under the effect of the spring (8), the lower end of the first shaft (5) touches the bottom of the lower guiding groove (7) all along. And the jaws (4) and their bended front limiting parts (41) is completely close, the lower ends of both of the first shaft (5) and the second shaft (6) are in the first sub-groove (71). Then the jaws returns to the initialization situation and the next capsule (9) can be hold in the laying space formed by the two bended front limiting parts (41). In this process, the front ends of the first shaft (5) and the second shaft (6) are sliding along the corresponding position on the upper guiding groove (7'), so that the first shaft (5) and the second shaft (6) can move synchronously.

In the whole working process, the front end and lower end of the second shaft (6) are respectively in the first sub-grooves (71',71) of the upper guiding groove (7') and the lower guiding groove (7) all along. And the action of the first shaft (5) is comparatively complex, in the phase of the extracting, the front end and lower end of the first shaft (5) enter from the first sub-grooves (71',71) of the upper guiding groove (7') and the lower guiding groove (7) into the third sub-groove (73',73) of the upper guiding groove (7') and the lower guiding groove (7), while in the phase of the moving backward after the extracting, the front end and lower end of the first shaft (5) pass through the third sub-groove (73',73) and the second sub-groove (72',72) in order, finally enter into the first sub-grooves (71',71).

What is claimed is:

1. An automatic ejecting device for capsules in a coffee machine comprising: a housing, a first frame and a second frame both mounted in said housing, said second frame designed to be movable forward and backward relative to said first frame, said first frame and the second frame forming a hermetic chamber after hermetically closing so as to contain the capsule, a driving system also being mounted in the housing to close and open said first frame and second frame;

two jaws movably jointing with two sides of said second frame respectively, the front portion of each jaw bending and extending to the front surface of said second frame to form a limiting part, these two limiting parts being set apart so as to limit the movement of the capsule, and the front portion of each jaw being able to splay and close relative to said second frame;

a first shaft being mounted on the front of each jaw vertically, and a second shaft being mounted on the rear of each jaw vertically, two pairs of guiding grooves being mounted on the housing, the ends of said first and second shafts on the jaws being slid-able in the guiding grooves, respectively, each pair of guiding grooves comprising an upper guiding groove and a lower guiding groove for guiding the first shaft, therefore enabling the front portion of each jaw to complete at least one splaying and one closing when said second frame is moving backward.

2. The automatic ejecting device for capsules in a coffee machine of claim 1, wherein both of said upper guiding groove and lower guiding groove comprises a first sub-groove, a second sub-groove and a third sub-groove; the second sub-groove is at the front of the first sub-groove and is convex outward, the third sub-groove is at the front of the second sub-groove and communicates with the front of second sub-groove, the front of the second sub-groove communicates with the front of the first sub-groove so that the first shaft can slide from the first sub-groove to the second sub-groove, the rear of the second sub-groove communicates with the middle of the first sub-groove so that the first shaft can slide from the second sub-groove to the first sub-groove;

in at least one of said upper guiding groove and said lower guiding groove, a step which is higher than the second sub-groove is formed at the boundary between the front of the second sub-groove and the first sub-groove, so as to prevent the first shaft from entering into the front of the first sub-groove from the front of the second sub-groove, and another step which is higher than the first sub-groove is formed at the boundary between the rear of the second sub-groove and the middle of the first sub-groove, so as to prevent the first shaft from entering into the rear of the second sub-groove from the middle of the first sub-groove;

the first shaft comprises an upper cylinder projected from the upper surface of the jaw and a lower cylinder projected from the bottom surface of the jaw, at least one of said two cylinders is movably located in the hole formed on the front portion of the jaw and supported by a spring.

3. The automatic ejecting device for capsules in a coffee machine of claim 2, wherein only the lower guiding groove has said steps.

4. The automatic ejecting device for capsules in a coffee machine of claim 2, wherein both the lower guiding groove and the upper guiding groove have said steps.

5. The automatic ejecting device for capsules in a coffee machine of claim 2 or 3 or 4, wherein said third sub-groove is gradually bending outward from rear to front from the axis of the pair of the third sub-grooves.

6. The automatic ejecting device for capsules in a coffee machine of claim 2 or 3 or 4, wherein said second sub-groove is convex outward in an arc-shape.

7. The automatic ejecting device for the capsules in the coffee machine of the claim 3, wherein the upper cylinder of the first shaft and the jaws are formed integratively.

8. The automatic ejecting device for the capsules in the coffee machine of claim 1, wherein said jaw joins with the second frame by the following structure: two projecting shafts are respectively mounted on the two sides of the second frame, and a lengthwise slot hole for receiving said shaft is set on the middle of each jaw.

9. The automatic ejecting device for the capsules in the coffee machine of claim 1, wherein the lower portion of the end of the bending front limiting part of the jaw is in the shape of a concave arc to support the capsule steadily when the jaws closed.

10. The automatic ejecting device for the capsules in the coffee machine of claim 1 or 2 or 3 or 4, wherein a cavity for containing the capsule is set in the rear portion of the first frame, and a compressed spring is fixed in the cavity so as to push the capsule outside from the cavity.

* * * * *